(12) United States Patent
Sørensen et al.

(10) Patent No.: US 10,529,352 B2
(45) Date of Patent: Jan. 7, 2020

(54) AUDIO SIGNAL PROCESSING

(71) Applicant: Microsoft Technology Licensing, LLC, Redmond, WA (US)

(72) Inventors: Karsten V. Sørensen, Stockholm (SE); Karlheinz Wurm, Altenmarkt (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 39 days.

(21) Appl. No.: 15/436,969

(22) Filed: Feb. 20, 2017

(65) Prior Publication Data

US 2018/0151187 A1 May 31, 2018

(30) Foreign Application Priority Data

Nov. 30, 2016 (GB) .................................. 1620317.6

(51) Int. Cl.
*G10L 19/00* (2013.01)
*G10L 19/16* (2013.01)
(Continued)

(52) U.S. Cl.
CPC ............ *G10L 19/167* (2013.01); *G10L 19/22* (2013.01); *G10L 19/26* (2013.01)

(58) Field of Classification Search
CPC ...................................................... G10L 19/00
(Continued)

(56) References Cited

U.S. PATENT DOCUMENTS 5,151,936 A * 9/1992 Riedle ................. H04M 7/0096
   379/402
5,457,685 A * 10/1995 Champion ............ H04M 3/561
   370/260
(Continued)

FOREIGN PATENT DOCUMENTS

EP 1555823 A1 7/2005
EP 2200025 A1 * 6/2010 ............. G10L 19/24
(Continued)

OTHER PUBLICATIONS

Qiu, et al., "Optimizing HTTP-Based Adaptive Video Streaming for Wireless Access Networks", In Proceedings of the 3rd International Conference on Broadband Network and Multimedia Technology, Oct. 26, 2010, 3 pages.
(Continued)

*Primary Examiner* — Michael C Colucci
(74) *Attorney, Agent, or Firm* — NovoTechIP International PLLC

(57) ABSTRACT

An audio signal processing device comprises: an audio input configured to receive an audio signal to be coded; an audio codec configured to apply audio coding to the audio signal, thereby generating coded audio data, having an audio bandwidth, for transmission to a remote device; a network interface configured to receive from the remote device an indication of at least one characteristic of an audio output device of the remote device; and an audio bandwidth selector configured to set an audio bandwidth parameter of the audio codec based on the indication received from the remote device, thereby setting the audio bandwidth of the coded audio data in dependence on the at least one characteristic of the audio output device.

26 Claims, 5 Drawing Sheets

(51) Int. Cl.
*G10L 19/22* (2013.01)
*G10L 19/26* (2013.01)

(58) Field of Classification Search
USPC ....... 704/232, 500, 275, 260, 229, 226, 222;
455/570, 450, 418; 370/338, 260, 259,
370/252
See application file for complete search history.

(56) References Cited

U.S. PATENT DOCUMENTS

| | | | | |
|---|---|---|---|---|
| 5,634,204 A * | 5/1997 | Takahashi | ............ | H04B 7/0814 455/134 |
| 5,696,879 A * | 12/1997 | Cline | ............ | G10L 19/00 704/260 |
| 6,327,249 B1 * | 12/2001 | Cookman | ............ | H04L 27/00 370/235 |
| 6,333,940 B1 * | 12/2001 | Baydar | ............ | H04J 3/1611 370/466 |
| 6,343,126 B1 * | 1/2002 | Stelman | ............ | H04M 1/215 379/387.01 |
| 6,680,972 B1 * | 1/2004 | Liljeryd | ............ | G10L 21/038 375/240 |
| 7,031,454 B1 * | 4/2006 | Stelman | ............ | H04M 1/738 379/387.01 |
| 7,111,049 B1 * | 9/2006 | Granger | ............ | G10L 19/0019 370/241 |
| 8,082,013 B2 | 12/2011 | Tamura et al. | | |
| 8,606,966 B2 | 12/2013 | Panigrahi et al. | | |
| 8,612,620 B2 | 12/2013 | Karlsson et al. | | |
| 8,649,300 B2 | 2/2014 | Li | | |
| 8,793,749 B2 | 7/2014 | Bennett | | |
| 8,856,272 B2 | 10/2014 | Baalu et al. | | |
| 9,049,042 B2 * | 6/2015 | Tagg | ............ | H04L 12/2856 |
| 9,253,532 B2 | 2/2016 | Chen et al. | | |
| 9,286,904 B2 | 3/2016 | Wakeland et al. | | |
| 9,386,331 B2 | 7/2016 | Falls | | |
| 9,620,101 B1 * | 4/2017 | Thandri | ............ | H03F 1/0222 |
| 2002/0064150 A1 * | 5/2002 | Pines | ............ | H04L 43/50 370/352 |
| 2003/0023329 A1 * | 1/2003 | Brooks, Jr. | ............ | H04R 5/02 700/94 |
| 2003/0026418 A1 * | 2/2003 | Cui | ............ | H04M 1/738 379/399.01 |
| 2003/0045235 A1 * | 3/2003 | Mooney | ............ | H04M 1/6066 455/41.1 |
| 2003/0067399 A1 * | 4/2003 | Wesley | ............ | G08G 1/095 340/907 |
| 2003/0221014 A1 | 11/2003 | Kosiba et al. | | |
| 2004/0038674 A1 * | 2/2004 | Brenig | ............ | H04M 3/42153 455/418 |
| 2004/0179605 A1 | 9/2004 | Lane | | |
| 2006/0069553 A1 * | 3/2006 | Hakansson | ............ | H04L 1/0014 704/222 |
| 2006/0080092 A1 * | 4/2006 | Sherman | ............ | H04L 1/24 704/226 |
| 2006/0274704 A1 * | 12/2006 | Desai | ............ | H04W 72/1215 370/338 |
| 2007/0098184 A1 * | 5/2007 | Ibe | ............ | H04R 5/04 381/77 |
| 2007/0123192 A1 * | 5/2007 | Sinai | ............ | H04M 1/6066 455/403 |
| 2008/0026718 A1 * | 1/2008 | Wangard | ............ | H04B 1/1027 455/266 |
| 2008/0249771 A1 * | 10/2008 | Wahab | ............ | G10L 25/78 704/233 |
| 2009/0068949 A1 * | 3/2009 | Lin | ............ | H04M 1/05 455/41.3 |
| 2009/0191822 A1 * | 7/2009 | Chen | ............ | H04W 88/06 455/90.2 |
| 2009/0193100 A1 | 7/2009 | Moradi et al. | | |
| 2010/0081380 A1 * | 4/2010 | Lim | ............ | H04M 1/7253 455/41.2 |
| 2010/0223053 A1 * | 9/2010 | Sandgren | ............ | G10L 19/012 704/219 |
| 2011/0202353 A1 * | 8/2011 | Neuendorf | ............ | G10L 19/20 704/500 |
| 2011/0222710 A1 * | 9/2011 | Biswas | ............ | H03G 9/025 381/107 |
| 2011/0258338 A1 * | 10/2011 | Vass | ............ | H04N 7/148 709/233 |
| 2011/0286343 A1 * | 11/2011 | Powell | ............ | H04W 76/10 370/252 |
| 2012/0002825 A1 * | 1/2012 | Alappat | ............ | H03G 5/165 381/104 |
| 2012/0264385 A1 * | 10/2012 | Oh | ............ | H04H 20/22 455/160.1 |
| 2012/0276912 A1 * | 11/2012 | Zhang | ............ | H04W 76/10 455/450 |
| 2013/0066641 A1 * | 3/2013 | Bruhn | ............ | H04M 3/569 704/500 |
| 2013/0301846 A1 * | 11/2013 | Alderson | ............ | H04R 3/002 381/71.7 |
| 2014/0067405 A1 * | 3/2014 | Patel | ............ | G10L 19/22 704/500 |
| 2014/0100001 A1 * | 4/2014 | Im | ............ | H04M 1/6058 455/570 |
| 2014/0371888 A1 | 12/2014 | Lundqvist | | |
| 2015/0142702 A1 * | 5/2015 | Nilsson | ............ | G06N 5/048 706/11 |
| 2015/0244336 A1 * | 8/2015 | Desmarais | ............ | H03G 1/02 381/105 |
| 2015/0245155 A1 * | 8/2015 | Root | ............ | H04R 29/004 381/66 |
| 2015/0268101 A1 * | 9/2015 | Kumahara | ............ | G06F 1/325 374/178 |
| 2015/0302854 A1 * | 10/2015 | Clough | ............ | G06F 19/3418 704/275 |
| 2015/0332677 A1 * | 11/2015 | Vasilache | ............ | G10L 19/02 704/229 |
| 2015/0332702 A1 * | 11/2015 | Disch | ............ | G10L 19/20 704/500 |
| 2016/0162255 A1 * | 6/2016 | Nishimura | ............ | G06F 3/165 381/303 |
| 2016/0165059 A1 * | 6/2016 | Deng | ............ | H04M 7/0072 370/252 |
| 2016/0165060 A1 * | 6/2016 | Li | ............ | H04M 7/0072 370/259 |
| 2016/0193084 A1 * | 7/2016 | Jenkins | ............ | A61F 11/14 381/72 |
| 2016/0203811 A1 * | 7/2016 | Brockmole | ............ | G10H 1/18 381/94.5 |
| 2016/0255348 A1 | 9/2016 | Panchagnula et al. | | |
| 2016/0309241 A1 * | 10/2016 | Ljung | ............ | H04L 65/80 |
| 2016/0352913 A1 * | 12/2016 | Wu | ............ | H04M 3/568 |
| 2017/0195325 A1 * | 7/2017 | Yamamoto | ............ | H04W 12/08 |
| 2018/0358028 A1 * | 12/2018 | Biswas | ............ | G10L 19/265 |

FOREIGN PATENT DOCUMENTS

| | | | | |
|---|---|---|---|---|
| JP | 09312596 A | * 12/1997 | ............ | G10L 19/00 |
| WO | 3091870 A1 | 11/2003 | | |
| WO | 2013043918 A1 | 3/2013 | | |

OTHER PUBLICATIONS

"International Search Report and Written Opinion Issued in PCT Application No. PCT/US2017/063167", dated Feb. 20, 2018, 13 Pages.

* cited by examiner

AUDIO SIGNAL PROCESSING

RELATED APPLICATIONS

This application claims priority under 35 U.S.C 119 or 365 to Great Britain Application No. 1620317.6 filed Nov. 30, 2016, the disclosure of which is hereby incorporated by reference in its entirety.

TECHNICAL FIELD

The present invention relates to audio signal processing, and in particular to the coding of an audio signal to generate coded audio data for transmission.

BACKGROUND

An audio signal may be transmitted from a local (transmitting) device, such as a user device or a media server, to a remote (receiving) device, such as another user device, via a communication channel. For example, the audio signal may be transmitted as a stream of audio data (audio stream). The communication channel may for example be a channel over a communications network, for example a packet-based communication network such as the Internet, where the devices are endpoints of the network.

The transmission may be based on VoIP (Voice over Internet Provider) technology in a call or other real-time media communication event conducted over the network. That is, the audio stream may be transmitted as part of a call between two or more users or other some other real-time media communication event conducted via the network. To enable the communication event to take place, a user of the receiving device may execute an instance of a communication client on the receiving device. The communication client sets up the necessary VoIP connections to allow communication with the transmitting device during the communication event. The transmitting device may also be a user device, on which another instance of the communications client is executed. Alternatively, the transmitting device may be a media server; for example, in a group call (conference call) between three or more users, each user may transmit their audio stream to a media relay server, and the server may selectively mix the received audio streams accordingly for transmission to the other users participating in the conference call.

The transmitted audio data may be coded audio data generated by an audio codec of the local device applying audio coding to the audio signal before transmission. The audio codec may be configured to code the audio signal according to a target bitrate, so as to generate a stream of coded audio data having a bitrate no more than the target bitrate, or in the case of a variable bitrate codec, one with a short-term average which does not exceed the target bitrate. As long at the target bitrate does not exceed an available bitrate of the communication channel (i.e. channel bitrate), the coded audio stream can be transmitted via the communication channel in real-time without having to any drop packets of coded audio data. The coded audio stream is received at the receiving device, decoded and output via an audio output device of the receiving device, such as a loudspeaker or headset.

The audio coding may involve lossless compression such as entropy encoding, whereby the amount of data needed to code the signal is reduced without losing any information from the signal. Whilst this can be effective at reducing the bitrate overhead needed to transmit the audio signal to some extent, in practice it is unlikely to be enough in itself to meet the target bitrate. To further reduce the bitrate of the coded audio stream, lossy audio coding can be used, whereby information is discarded from the audio signal as part of the audio coding process. For some speech and audio codecs, the lossy coding includes an initial down-sampling of the input signal. This is used when coding at very low target bitrates, where coding distortion begins to severely impact the quality of the coded signal. Internally in the codec, the potentially down-sampled input signal is then modelled using, e.g., mathematical models that are chosen due to their properties for modelling human speech using only a limited set of coefficients. This can be interpreted as doing a joint quantization of the samples within each frame, and often also with a dependency on previous samples as well.

In order for an audio codec to meet a certain target bitrate and to ensure the best quality at that bitrate then, broadly speaking, the sample rate, the allowed coding noise at a given sample rate, or a combination of both can be adapted.

With regards to sample rate, the coded audio data has an audio bandwidth, which is the range of audio frequencies spanned by the coded audio data i.e. the coded audio data contains only enough information to reproduce audio frequencies from the original audio signal within this range of audio frequencies. It is generally accepted that audio frequencies above 20 kHz are inaudible to most humans thus, by discarding frequencies above this, information can be discarded from the signal with no or negligible impact on perceived quality. According to the Nyquist theorem, the audio bandwidth and sample rate are tightly coupled, in that to capture all frequencies up to R/2 Hz without distortion due to aliasing, a sample rate of at least R samples per second is required. Thus, to re-produce the full range of audible frequencies in the audio signal, sampling significantly above 40 kHz (i.e. 40.000 samples per second) is generally considered unnecessary; for example, 44.1 kHz and 44 kHz are two commonly used sample rates that are generally accepted as full-band sampling rates. Conversely, sampling at R significantly below 40 kHz can result in a loss of audible high frequency components of the audio signal between R/2 and 20 kHz and aliasing artefacts, as the audio bandwidth is reduced. In practice, an audio codec may also include an anti-aliasing filter (AAF) that filters out frequencies above R/2 from the audio signal before sampling it at rate R, as this can prevent aliasing artefacts.

With regards to coding, broadly speaking, more aggressive coding (i.e. coarser quantization and more inaccurate modelling) results in a higher level of coding distortion. Modern audio codecs provide increasingly sophisticated modelling of the signal so as to minimize the coding distortion for a given sample rate and target bitrate, but nevertheless this basic relation between coarseness and distortion stands.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In high level terms, to achieve a higher audio bandwidth (corresponding to a wider range of audio frequencies), a higher sample rate is needed; to keep within an available bitrate, this increase in the number of bits per second generally needs to be compensated for with a corresponding decrease in the (average) number of bits per sample (typically achieved, at least in part, by applying more aggressive coding and coarser quantization) which in turn can result increased distortion when the audio data is decoded and played out. Conversely, a significant decrease in the audio bandwidth can result in a loss of audible high frequencies (a lower audio bandwidth corresponding to a narrower range of audio frequencies); however, this also reduces the required sample rate, which in turn allows more bits to be used per-sample without exceeding the available bitrate, which in turn can lead to reduce distortion (particularly as it allows the audio codec to apply less aggressive quantization).

Therefore, particularly where the available bitrate is constrained, in optimizing perceptual quality of the encoded audio data (i.e. the quality as perceived by a human when it is decoded and played out) a balance needs to be struck between, on the one hand, the loss of audible high frequency components at lower audio bandwidths and, on the other hand, the increased distortion that can arise as a consequence of preserving a higher audio bandwidth.

The inventors of the present invention have recognized that, in striking this balance, a material factor to consider is the nature of the audio output (playout) device that the audio signal will be played out of, once received and decoded at a remote endpoint.

According to a first aspect of the present invention, an audio signal processing device comprises: an audio input configured to receive an audio signal to be coded; an audio codec configured to apply audio coding to the audio signal, thereby generating coded audio data, having an audio bandwidth, for transmission to a remote device; a network interface configured to receive from the remote device an indication of at least one characteristic of an audio output device of the remote device; and an audio bandwidth selector configured to set an audio bandwidth parameter of the audio codec based on the indication received from the remote device, thereby setting the audio bandwidth of the coded audio data in dependence on the at least one characteristic of the audio output device.

In particular, where the available bitrate is highly constrained, the inventors have observed that at certain available bitrates, for a lower quality output device such as an integrated (i.e. built-in) loudspeaker of a user device (e.g. laptop, smartphone, tablet etc.) a higher audio bandwidth can result in higher perceptual quality notwithstanding the resulting increase in distortion, as compared with a higher quality audio output device such as an external headset. That is, for lower quality audio output devices, a loss of higher audible frequencies can be more noticeable than the increased distortion that is the cost of preserving those frequencies.

In embodiments, the audio codec may have an input configured to receive an indication of a target bitrate for the coded audio data, and the audio codec is configured to code the audio signal according to the target bit rate.

The indication of the target bit rate constitutes a request that the coded audio data is generated at a rate no greater than the target data rate. Note however that with certain audio codecs, such as Silk and Opus, the output rate can exceed a received target bitrate for brief periods of time, which introduces some additional packet jitter; however, in a real-time communication context, this can be accounted for by allowing a jitter buffer at the receiving device to increase the latency slightly to wait for the delayed packet, which in turn allows the slightly too large packet to be decoded a bit later with no packet loss. The time-scales involved are such that there is no perceptible loss of real-time behaviour.

In such embodiments, the audio bandwidth selector may be configured to set the audio bandwidth parameter based on the indication of the audio output device characteristic and the indication of the target data rate.

For example, preferably the audio bandwidth selector comprises: a threshold setting component configured to determine at least one audio bandwidth switching threshold (switching point) based on the indication of the audio output device characteristic, and a comparing component configured to set the audio bandwidth parameter by comparing the target data rate with the audio bandwidth switching threshold.

The audio bandwidth selector increases (response (resp.) decreases) the audio bandwidth in response to a change in the target bitrate from a value below (resp. above) the switching threshold to a value above (resp. below) that switching threshold. Adapting the switching thresholds based on the audio output device characteristic can for example ensure that such an increase in the bandwidth occurs sooner (i.e. at a lower target data rate) for a low-quality integrated audio output device (for which loss of high frequency components of the audio signal is more noticeable) than for a higher-quality external audio output device (for which increased distortion is more noticeable).

The indication of the audio output device characteristic may indicate whether the audio output device is an integrated device or an external device.

A lower audio bandwidth switching threshold may be set if the audio output device is an integrated device than if it is an external device.

The audio codec may comprise an audio sampler configured to generate samples of the audio signal at a sample rate corresponding to the audio bandwidth parameter, and an audio coder configured to code the samples according to the target data rate.

The audio signal may be a digital audio signal and the audio sampler may be a re-sampler.

The audio codec may comprise a filter configured to filter the audio signal to filter out audio frequencies outside of the audio bandwidth.

The audio bandwidth selector may be configured to adapt the audio bandwidth parameter in response to a further indication from the remote device denoting a change of audio output device at the remote device.

The coded audio data may be transmitted to the remote device as part of a call in which a user of the remote device is participating.

The change of audio device may occur during the call and the further indication may be received during the call.

The audio signal processing device may be a user device or a server, for example.

For at least some values of the target data rate, a lower audio bandwidth may be set if the audio output device is an external device than if it is an integrated device.

The audio signal processing device may comprise a channel monitoring component configured to monitor a communication channel via which the coded audio data is to be transmitted to the remote device, and to adapt the target bit rate based on the channel monitoring.

A second aspect of the present invention is directed to a method of coding an audio signal for transmission to a remote device, the method comprising, at a local audio signal processing device: receiving an audio signal to be coded; applying, by an audio codec of the local device, audio coding to the audio signal, thereby generating coded audio data, having an audio bandwidth, for transmission to the remote device; receiving at the local device from the remote device an indication of at least one characteristic of an audio output device of the remote device; and setting an audio bandwidth parameter of the audio codec based on the indication received from the remote device, thereby setting the audio bandwidth of the coded audio data in dependence on the at least one characteristic of the audio output device.

In embodiments, the method may comprise receiving at the audio codec an indication of a target data rate for the coded audio data, wherein the audio codec codes the audio signal according to indicated the target data rate.

The audio bandwidth parameter may be set based on the indication of the audio output device characteristic and the indication of the target data rate.

Setting the audio bandwidth parameter may comprise: determining at least one audio bandwidth switching threshold based on the indication of the audio output device characteristic, and setting the audio bandwidth parameter by comparing the target data rate with the audio bandwidth switching threshold.

In embodiments, any feature of any embodiments of the first aspect may be implemented in performing the method.

A third aspect of the present invention is directed to a computer program product comprising code stored on a computer readable storage medium and configured, when executed on a processor of an audio signal processing device, to implement the method of the second aspect or any embodiment thereof.

BRIEF DESCRIPTION OF FIGURES

For a better understanding of the present invention and to show how the embodiments of the same may be carried into effect, reference is made to the following Figures, in which.

DETAILED DESCRIPTION OF EXAMPLE EMBODIMENTS

Figure 1:
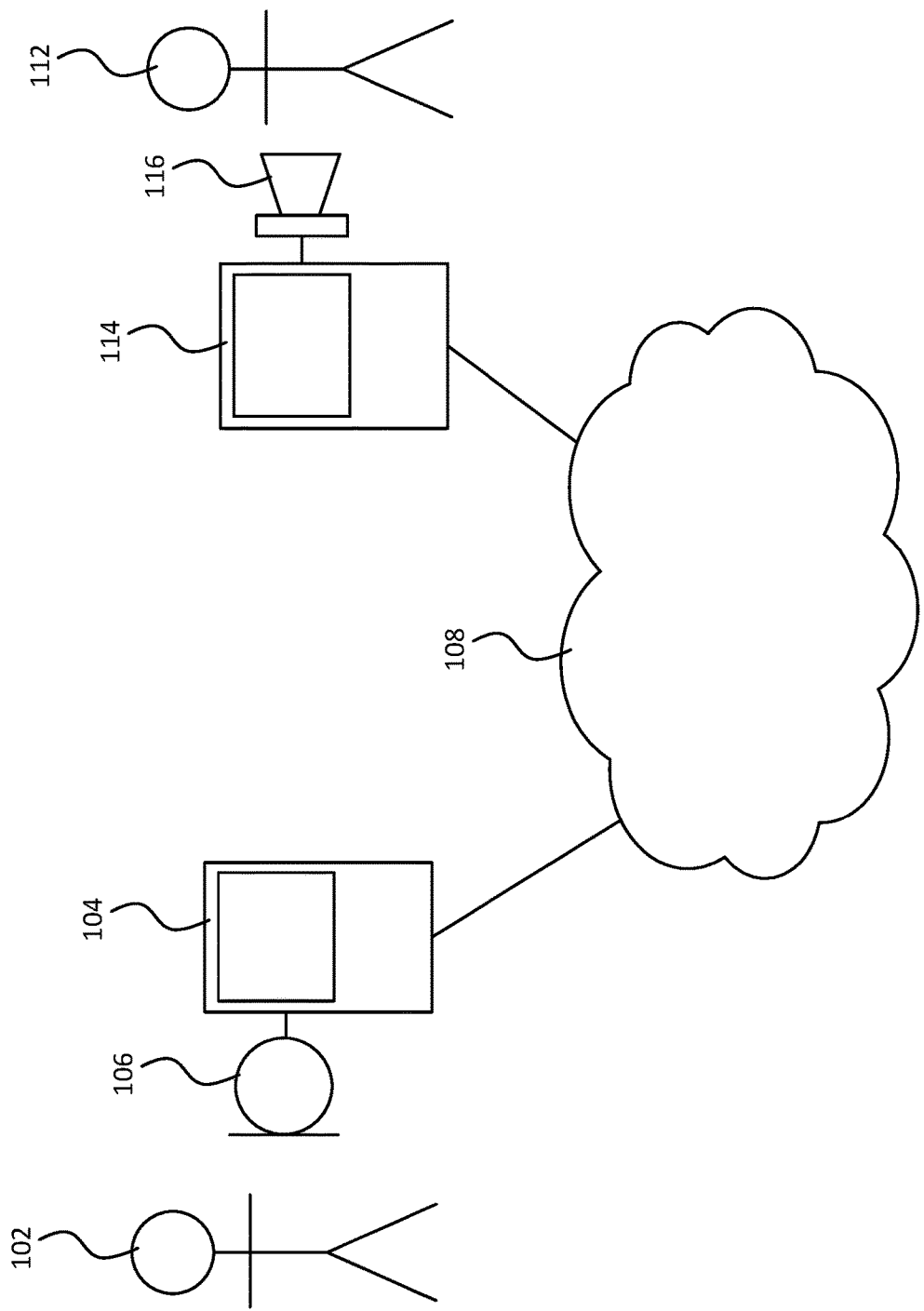
FIG. 1 shows a schematic block diagram of a communication system.

FIG. 1 shows a communication system comprising a first user device 104 operated by a first user 102 (near-end user) and a second user device 114 operated by a second user 112 (far-end user). The user devices 104, 114 are computer devices, such as laptop or desktop computers, smartphones, tablet etc. Although only two users 102, 112 as shown, it will be appreciated that the communication system can have any number of users operating any number of user devices.

The user devices 104, 114 are shown connected to a network 108, which is a packet-based computer network such as the Internet. The first user device 104 is shown to comprise at least an audio input device 106, such as a microphone or microphone array. The second user device 114 is shown to comprise at least an audio output device 116, such as an integrated loudspeaker or speaker set, or external headset.

An integrated audio output device means an audio output device, such as a loudspeaker or set of loudspeakers, that is integrated in a body of the user device 114 itself, for example in a casing or housing of the user device. Integrated mono or stereo loudspeakers are common in portable devices, such as laptops, phones, tablets etc. By contrast, an external audio output device means a device that is external to the body of the user device, such as a headset (e.g. pair of headphones, with or without a built in microphone(s)), an earpiece, a high-quality external loudspeaker or speaker set etc. An external audio output device can connect to the user device 114 via a wired connection, for example via a headphone jack or data port (e.g. USB) of the user device 114. Alternatively, the headset may connect to the user device 114 wirelessly, e.g. via Bluetooth.

Embodiments of the present invention are described in the context of an audio signal coded at the first user device 104 and transmitted to the second user device 114 via the network 108. In this context, the first user device 104 is referred to as the local device and the second user device 114 as the remote device. In some contexts, to provide two-way communication, such as a two-way call between the users 102, 112, the same techniques can be applied to code an audio signal at the second user device 114 for transmission to the first user device 104.

Figure 2:
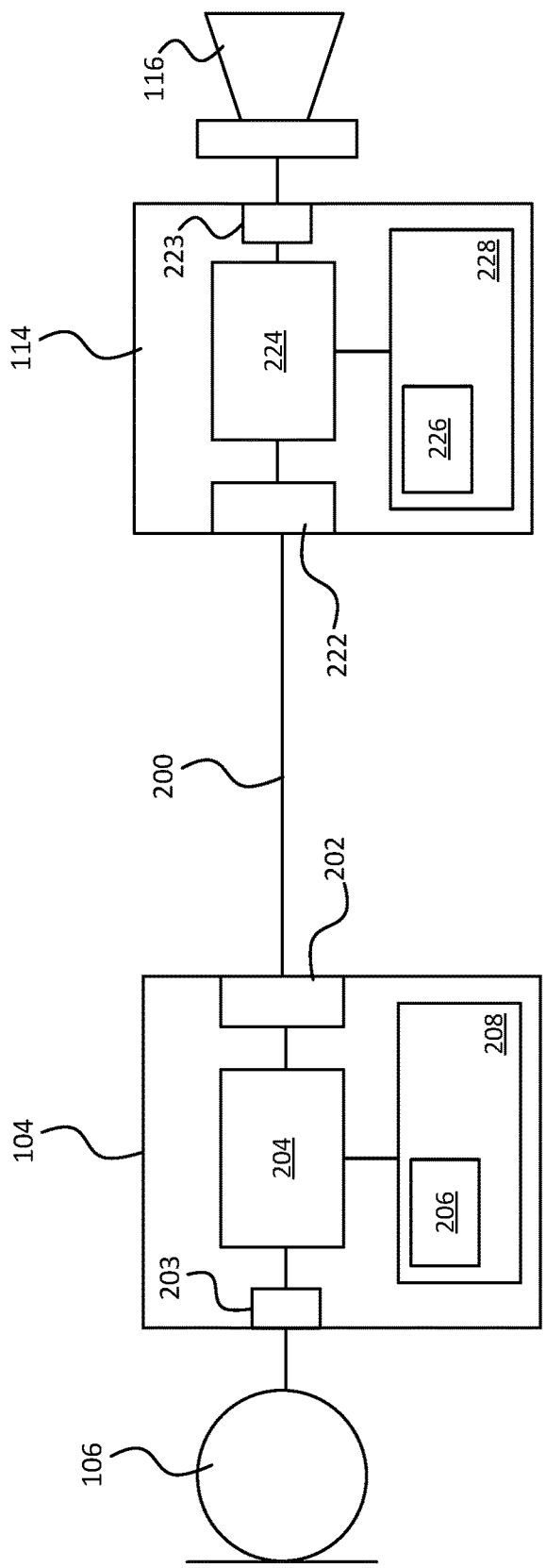
FIG. 2 shows a schematic block diagram of a local device in communication with a remote device via a communication channel.

With reference to FIG. 2, the local device 104 comprises a processor 204, such a computer processing unit (CPU) or CPU's, and, connected to the processor 204, a network interface 202, an audio interface 203, such as a sound card, and memory 208. The memory 208 holds executable code for execution on the processor 204, and in particular a client application 206 for execution on the processor 204. The audio input device 106 of the local device 104 is connected to the processor 204 via the audio interface 203.

The remote user device 114 also comprises a processor 224, such as a CPU or CPU's, and, connected to the processor 224, a network interface 222, an audio interface 223, such as a sound card, and memory 228. The memory 228 holds executable code for execution on the processor 224, and in particular, a corresponding client application 226 for execution on the processor. The audio output device 116 of the remove device 114 is connected to the processor 224 via the audio interface 223.

A communication channel 200 is shown established between the devices 104, 114 via their respective network interfaces 202, 222. The communication channel 200 is established via the network 108 by the clients 206, 226 when executed on their respective devices 104, 114. The communication channel 200 allows at least data to be transmitted from the local device 104 to the remove device 114 via the communication channel, and in the described examples also allows data to be transmitted from the remote device 114 via the communication channel 200 to the local device 104. In this way, the clients 206, 226 can effect a communication event, such as a call, between the users 102, 112 via the communication channel 200.

In particular, coded audio data generated by applying audio coding to an audio signal generated by the audio input device 106 can be transmitted via the communication channel 200 to the remote device 114 for decoding and outputting via the audio output device 116. The coded audio data is transmitted as a real time audio stream, to allow a real time call to be conducted between the users 102, 112 via the communication channel 200.

As noted, when coding audio at low bitrates, a trade-off may need to be made between having high audio bandwidth and low coding distortion. At higher bitrates higher audio bandwidth is generally preferred over lower audio bandwidths, but at low bitrates, higher audio bandwidth leads to more audible coding distortion. The level of detail that can be heard in an audio signal with a high quality headset varies significantly from a when playing out using a low quality laptop loudspeaker, and therefore the best trade-off depends on the characteristics on the playout device on the remote endpoint. As described in detail below, characteristics of the playout device on the remote endpoint are accounted for when determining the audio bandwidth that is preserved by the codec.

For example, when setting up a call, each endpoint could reveal to the other endpoint some characteristics of the playout device, e.g. if using a speaker or a headset to playout the audio. The encoders (audio codecs) on the endpoints can then take into account this remote endpoint information when choosing the switching points (audio bandwidth switching thresholds) for the different audio bandwidths that is supported by the codec. Particularly, it is desirable to switch to higher audio bandwidths at lower target bitrates when the remote endpoint is playing out on an integrated speaker, than when using an external headset. As the call proceeds, any change in the audio output device setup (for example, connecting or disconnecting a headset) can be signalled during the call and the audio bandwidth adapted accordingly.

Figure 3:
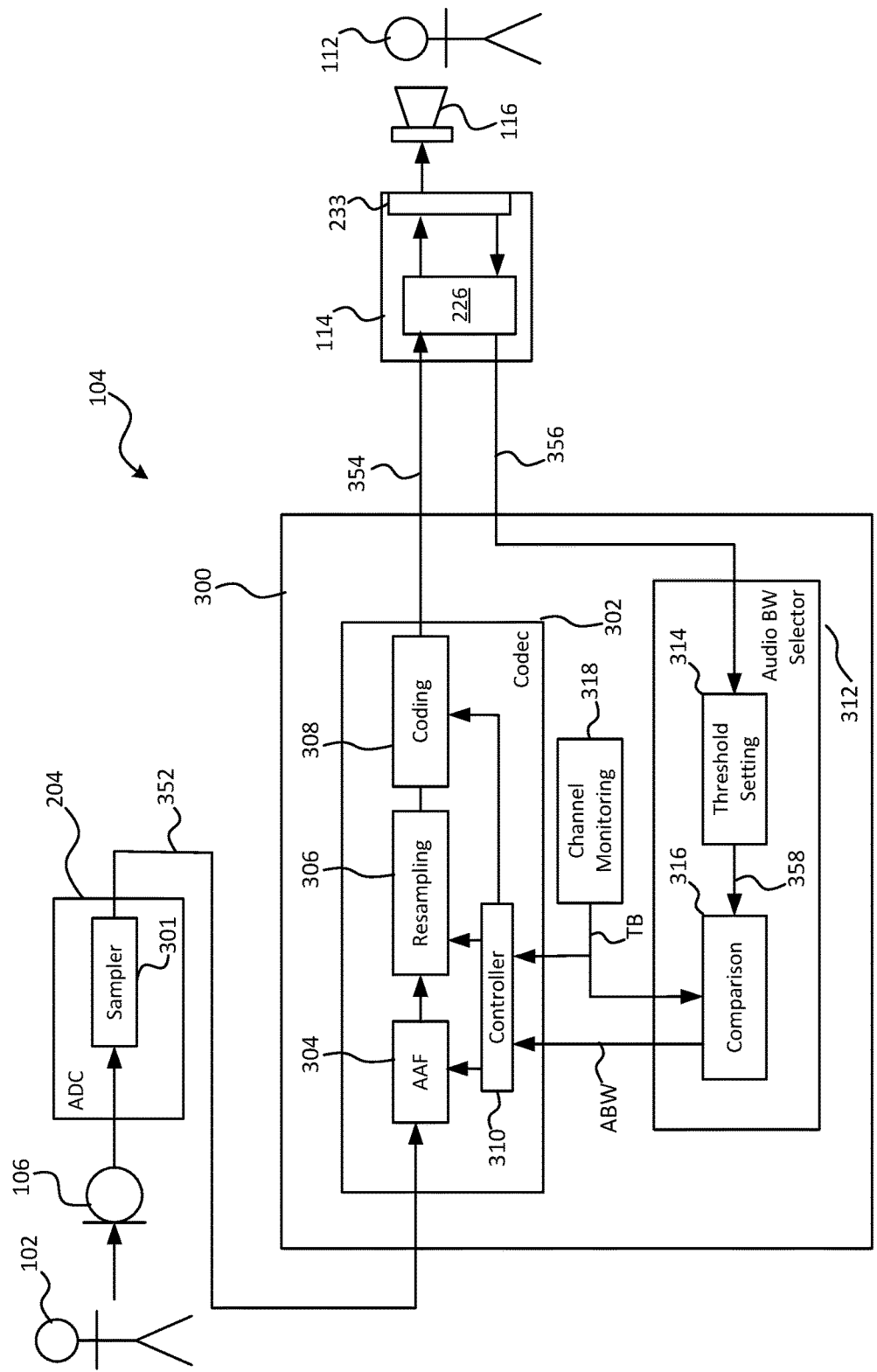
FIG. 3 shows a functional block diagram for a local device.

FIG. 3 shows a functional block diagram of the local device 104. The local device 104 is shown to comprise an audio signal processing system 300, which represents functionality implemented by the client application 206 of the local device 104 when executed on the processor 204 of the local device 104. The audio signal processing system 300 comprises an audio codec 302, an audio bandwidth selector 312 and a channel monitoring component 318. The channel monitoring component 318 monitors the communication channel 200 and outputs information derived from this monitoring to the audio codec 302 and the audio bandwidth selector 312.

The audio codec 302 is shown to comprise an anti-aliasing filter 304 (AAF), an audio sampler 306, and an audio coder 308 which cooperate to apply audio coding to an audio signal 352. That is, the AAF 304, audio sampler 306 and coder 308 cooperate to generate from the audio signal 352 coded audio data 354 for transmission via the communication channel 200 to the remote device 114 as a real time audio stream. The audio signal 352 is a speech-containing signal generated by the audio input device 106; that is, it contains speech captured from the near-end user 102 to be played out to the far-end user 112. This allows the far-end user 112 to hear what the near-end user 102 is saying in real-time during the call.

The AAF 304 has an input connected to receive the audio signal 352 from the audio input device 106 via the audio interface 204 of the local device 104. The AAF 304 has an output connected to an input of the audio sampler 306, which in turn has an output connected to an input of the coder 308. The AAF 304 filters the audio signal 352. The filtered audio signal is sampled by the audio sampler 306 to generate a stream of samples, and the samples are coded by coder 308 to generate the coded audio data 354.

Note in this example, the audio interface 204 operates as an analogue-to-digital converter (ADC), and as such includes its own audio sampler 301 which converts the audio signal 352 generated by the audio input device 106 from an analogue to a digital form. The audio sampler 306 of the audio codec 302 thus operates as a re-sampler in this context, by re-sampling the digital audio signal 352 as part of the applied audio coding.

The audio codec 302 also comprises a controller 310, which controls the operation of the AAF 304, the audio sampler 306, and coder 308 as described in further detail below.

The controller 310 of the audio codec 302 has a first input is connected to receive an indication of a target data rate, which is a target bitrate TB. The audio codec controller 310 controls the operation of the audio sampler 306 and coder 308 such that the coded audio data 354 is generated at a rate that does not exceed the target bit rate TB, and which preferably equals the target bit rate TB at least approximately. As indicated, the coding operations performed by the coder 308 can, for example, involve quantization and/or modelling of the sampled signal. For example, the coder 308 can implement any of the coding processes described in the Background section above to code the sampled signal according to the target bit rate TB.

The channel monitoring component 318 determined the target bitrate TB based on the monitoring of the communication channel 200. In particular, the target bitrate TB is set by the channel monitoring component 318 on a current available channel bandwidth of the communication channel 200; that is, a maximum bitrate currently available for the communication channel 200, and the target bitrate TB is set by the channel monitoring component such that the target bitrate TB does not exceed the current maximum available bitrate for the channel 200.

It is important to note the distinction between the channel bandwidth of the communication channel 200 and the audio bandwidth of the coded audio data 354. The channel bandwidth is a characteristic of the communication channel 200, which sets the maximum rate at which data can be transmitted via the communication channel 200, whereas the audio bandwidth of the coded audio data corresponds to the range of audio frequencies that are encoded in the coded audio data. That is, the coded audio data 354 contains only information about components of the audio signal 352 within this range of audio frequencies such that those frequency components can be reproduced and played out once the coded audio data 354 is decoded at the remote device 114. The coded audio data 354 cannot be transmitted to the remove device 114 via the communication channel 200 at a data rate that exceeds the available data rate of the communication channel 200 corresponding to the available channel bandwidth. Thus, in order to preserve real time communications without packet loss the coded audio data 354 should not be generated by the audio codec 302 at a rate that exceeds this.

The audio codec controller 310 has a second input connected to receive an audio bandwidth parameter ABW which indicates a desired audio bandwidth for the coded audio data 354. In controlling the operation of the sampler 306 and coder 308, the audio codec controller 310 ensures that the coded audio data 352 has the desired audio bandwidth without exceeding the target bit rate TB. It does so by setting a sample rate of the re-sampler 306 to correspond to the audio bandwidth indicated by the audio bandwidth parameter ABW (see above) and sets one or more control parameters of the coder 308 such that the coded audio data 354 is generated at a rate that does not exceed the target bitrate TB for the current sample rate of the re-sampler 306, or at least which does not substantially exceed the target bit rate (as noted, the target bit rate TB may be exceeded briefly at times for certain audio codecs, but it is possible to account for this as described above). Audio codecs having the necessary functionality to operate within the constraints of a target bit rate are known in the art, for example the Silk and Opus codecs have this functionality.

As will be appreciated, the representation of the audio codec 302 in FIG. 3 is highly schematic. It represents basic building blocks that are found in many audio codecs; however, modern audio codecs in particular may comprise additional and advanced functionality that is not shown in FIG. 3 in order to minimise distortion introduced in the audio coding within a given set of imposed constraints.

The audio bandwidth selector 312 sets the audio bandwidth parameter ABW. In this example, the audio bandwidth selector 312 is shown to comprise a threshold setting component 314 and a comparing component 316. The audio bandwidth selector 312, and in particular the threshold setting component 314 has an input configured to receive information 356 transmitted from the remote device 114 to the local device 104, which pertains to the audio output device 116 of the remote device 114. The threshold setting component 314 has an output connected to an input of the comparing component 316, and the component 316 has a second input connected to receive the indication of the target bitrate TB from the channel monitoring component 318. It is the comparing component 316 that sets the audio bandwidth parameter ABW based on the information 356 relating to the remote audio output device 116 and the target bitrate TB, as will now be described in detail.

Figure 4:
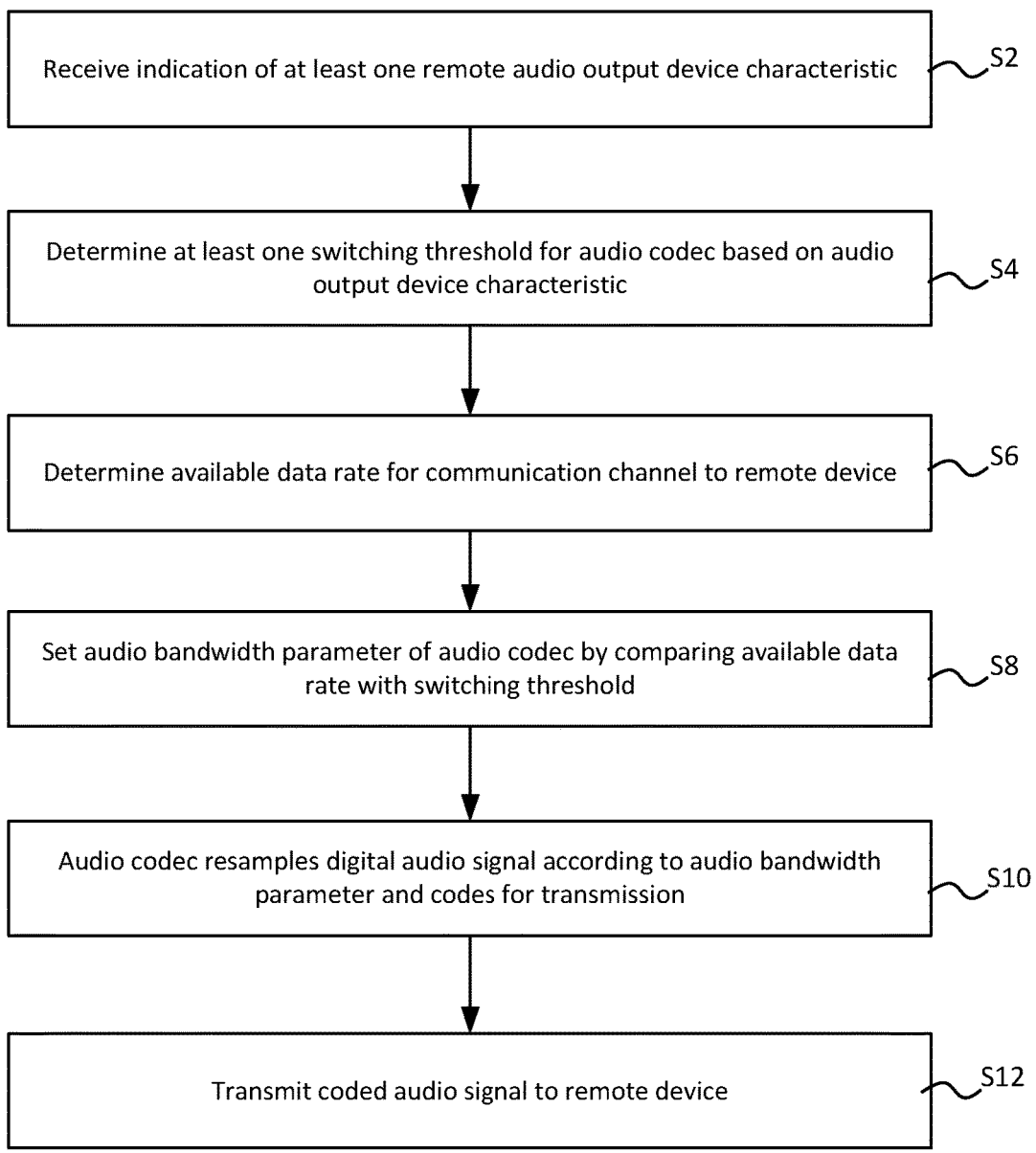
FIG. 4 shows a flowchart for a method of coding an audio signal.

FIG. 4 shows a flowchart for a method of coding the audio signal 352. The method is implemented by the audio signal processing system 300 of the local device 104.

At step S2, the audio output device information 356 is received at the audio signal processing system 300 from the remote device 114. The information 356 is an indication of at least one characteristic of the audio output device 116. The indication 356 can, for example, be transmitted from the remote device 114 to the local device 104 at the start of a call between the users 102, 112 for example, during a call establishment process (i.e. during call signalling) performed to establish the call, or shortly after the call has been established (e.g. within a few seconds of the call being established). In some implementations, one or more further such indications may be transmitted during the on-going call if and when a change occurs in the audio output device setup of the remote device 114. For example, the indication 356 can indicate whether the audio output device 116 is an integrated loudspeaker of the remote device 114 (generally of relatively low quality) or an external headset (generally of better quality). A further indication may be transmitted, for example in response to the remote user 112 connecting or disconnecting a headset from the audio interface 233 such that the audio output device setup changes during the call. The indication 356 and, where applicable, the one or more further indications can be transmitted via the communication channel 200 for example, using RTCP (Real-time Transport Protocol (RTP) control protocol) in the case that the coded audio data 354 is transmitted using RTP (real time transport protocol). This is a form of in-call media signalling. As is known in the art RTCP provides a mechanism by which control information for an RTP stream can be communicated between the transmitter and the receiver of that RTP stream (in this case the audio stream carrying the coded audio data 354).

Steps S4 to S8 are performed by the audio bandwidth selector 312 in order to set the audio bandwidth parameter ABW based on the received indication 356 at the start of the call. These steps can be re-performed each time a further indication is received during a call indicating a change in the audio output device setup at the remote device 114 in order to adapt the audio bandwidth parameter accordingly.

At step S4 the threshold setting component 314 determines at least one audio bandwidth switching threshold based on the indicated audio output device characteristic. The switching threshold is denoted 358 and is outputted to the comparing component 316. The switching threshold 358 is a bitrate threshold which denotes when a change should occur in the audio bandwidth parameter ABW in a response to a change in the target bitrate TB. The comparing component 316 compares, at step S8, the target bitrate TB with the at least one switching threshold 358 in response to a change in the target bitrate TB from a value below (one of) the switching threshold(s) 358 from a value below it to a value above it, the comparing component 316 adapts the audio bandwidth parameter ABW to indicate a wider audio bandwidth for the coded audio data 354. That is, a larger range of audio frequencies. Likewise, in response to a change in the target bitrate from a value above (one of) the switching threshold(s) 358, the comparing module 316 narrows the audio bandwidth indicated by the audio bandwidth parameter ABW. That is, to indicate a narrower range of audio frequencies for the coded audio data 354. The audio codec controller 310, as noted, receives the target bitrate TB and the audio bandwidth ABW. At step S10 it sets the output sample rate of the re-sampler 306 to correspond to the audio bandwidth indicated by the audio bandwidth parameter ABW. It also sets a filtering range of the AAF 304 based on the audio bandwidth parameter ABW, in order to filter out audio frequencies above the upper limit of the audio bandwidth from the audio signal 352 before the audio signal 352 is re-sampled by re-sampler 306. The sample rate for the re-sampler 306 corresponding to two times the audio bandwidth parameter ABW is denoted R in FIGS. 5 and 6.

Figures 5, 6:
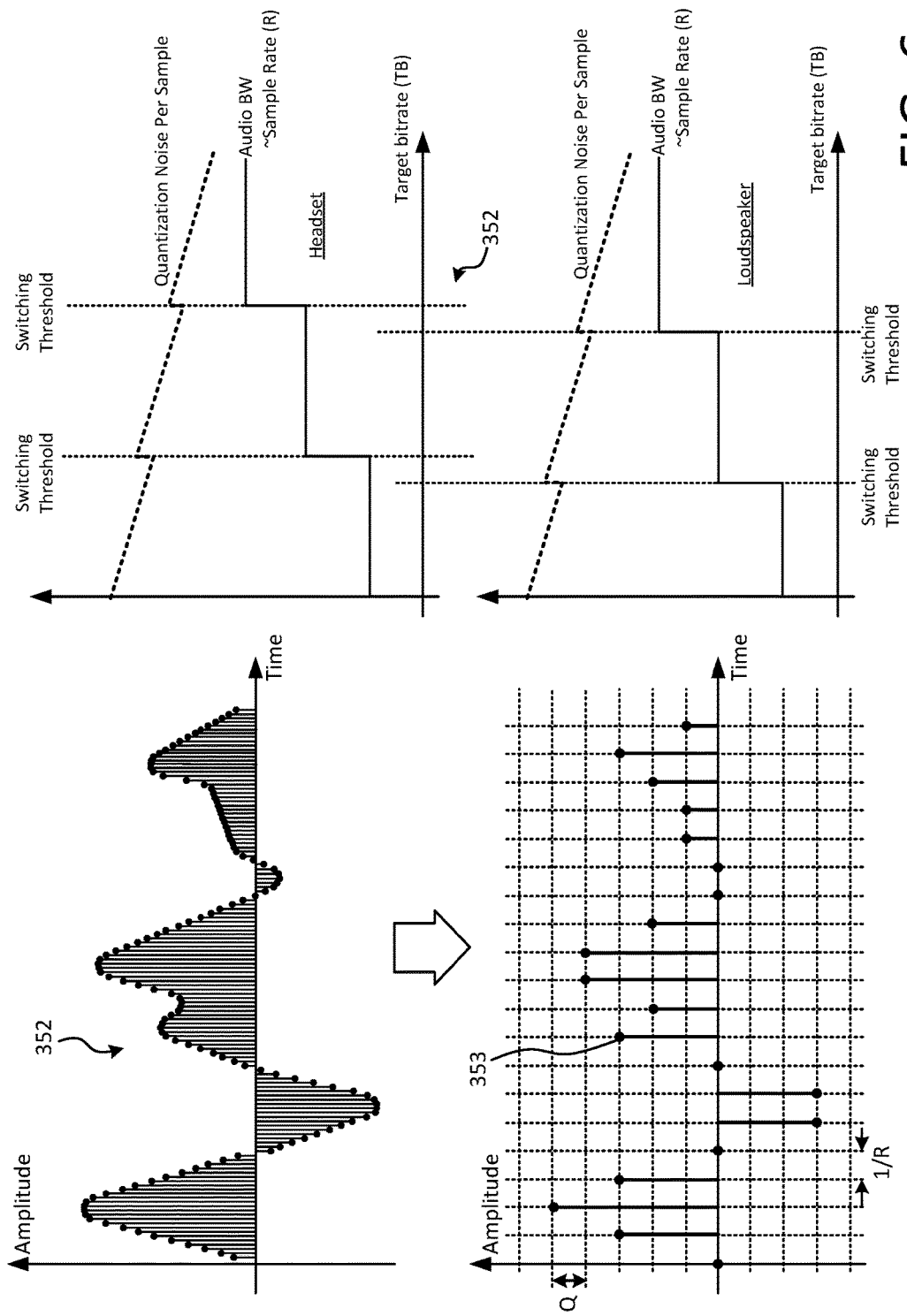
FIG. 5 schematically illustrates certain principles of audio signal coding.
FIG. 6 shows graphs illustrating how audio bandwidth switching thresholds can be adapted dependent on audio output device characteristics.

With reference to FIG. 5, the re-sampler 306 samples the filtered audio signal 352 in the time domain at the sample rate R such that a new sample of the coded audio data 354 is generated at that rate R (the duration between each new sample being 1/R). The filtered audio signal 352 is shown in FIG. 5 as a digital signal, having a higher sample rate.

As will be appreciated, the sample rate R does affect the bitrate at which the coded audio data 354 is generated (i.e. the number of bits, as opposed to samples, that are generated per second) but it is not the only factor; the bitrate also depends on the number of bits that are needed, on average, to encode each of those samples. This in turn depends on how aggressively the coder 308 reduces the bitrate, by allowing more distortion, when representing the samples.

As shown in the bottom graph of FIG. 5, for each sample generated by re-sampler 306, the coder 308 codes the samples and produces a bitstream 353. When decoding the bitstream the speech information and perceptual quality is preserved as far as possible, but the sample values may not correspond exactly to the value of the original audio signal 352 at the time the sample is taken. Reducing the number of bits that are used to represent the audio samples will generally lead to increased distortion of the captured audio.

By way of illustration, FIG. 5 shows quantization step size as Q (quantization parameter). The audio codec controller 310 can, for example, increase the value of the quantization parameter Q such that fewer but more widely spaced apart quantized values are used to represent the amplitude of the audio signal 352 such that the amount of data needed to code the audio signal 352 per second does not exceed, but preferably is as close as possible to, the target bitrate TB. As will be appreciated, this is a highly simplified example for the purposes of illustration. As noted, modern audio codecs have increasingly sophisticated functionality, where the quantization can, for example, be adapted based on sophisticated modelling of the audio input signal 352, such as speech modelling. The precise mechanics of how the audio codec 302 codes the audio signal 352 within the constraints of the audio bandwidth parameter ABW and the target bitrate TB are to some extent immaterial; what matters in the present context is how the audio bandwidth parameter ABW is set, not the precise means by which the audio codec responds to changes in the target bit rate TB and audio bandwidth parameter ABD in order to keep within the target bit rate TB.

Particularly in the context of a call, where the audio signal contains speech, the energy of the speech signal is typically concentrated around 50-3000 Hz with relatively low energy above 3 kHz. According to conventional wisdom, when the available bitrate is constrained, it would be logical to focus on the lower frequency part of the spectrum where the most energy is; this principle has led to a variable audio bandwidth approaches, where the audio bandwidth is reduced as a function of bitrate to focus on this part of the spectrum where the signal energy is most concentrated.

However, as noted above, for lower quality audio output devices, such as integrated loudspeakers, the inventors have realized that a loss of higher audible frequencies can be more noticeable than the increased distortion that is the cost of preserving those frequencies. This realization came about in listening tests, when it was observed that certain users were reporting higher quality audio than others for calls where the bitrate was highly constrained. By analyzing the test results, the inventors were able to determine that users with low-quality integrated loudspeakers were rating audio coding with higher bandwidths and more coding distortion higher than coding modes with lower audio bandwidths, and that it the opposite was the case for users that were using headsets as the playout device.

It is believed that this stems, at least in part, from the inability of such devices to reproduce lower frequencies accurately, for example below around 200-300 Hz. This is at least partially a consequence of their physical geometry (integrated speakers tend to be integrated in thin, portable devices which restricts their ability to reproduce low frequencies at even moderate volume levels); some devices with integrated speakers also filter out low frequencies that the integrated speakers would be unable to reproduce well if at all.

With reference to FIG. 6, this shows how the switching threshold(s) 352 may be adapted in dependence on the indicated audio output device characteristic 356. In particular, it shows higher switching thresholds 358 being set when the audio output device 116 is an external headset (top graph) than when it is an integrated loudspeaker (bottom graph). A switch to a higher audio bandwidth at lower target bitrates, even at the cost of having to apply more aggressive coding to compensate, is preferred in the case of an integrated loudspeaker. Conversely, for the external headset, a switch to a higher audio bandwidth is deferred until a higher target bitrate is reached in order to avoid having to apply more aggressive coding, even though it means a loss of higher frequency audio components at higher target bitrates. Purely to aid illustration, FIG. 6 shows in high level terms how the quantization node per sample resulting from the basic quantization of FIG. 5 might vary as Q is increased and decreased to account for changes in the target bitrates, taking into account the switches in the sample rate R at the relevant switching thresholds 358. It will be appreciated that this is an extremely simplified example for the purposes of illustration only, and does not for example consider modelling of the kind described above.

At step S12, the coded audio data 352 is transmitted to the remote device 114 via the communication channel 200.

Note, although the above has been described in the context of an audio signal processing device which is the user device 102, alternatively the audio signal processing device may be a server, for example a conference server via which conference calls between three or more users are conducted. The conference server may receive audio streams from each of the three or more users, and generate one mixed audio signal per user for transmission to that user, by mixing together the audio streams of the other users (this avoids transmitting multiple streams to each user, hence saves bandwidth). In this scenario, the conferencing server can apply the coding techniques described herein to the mixed audio signal. Further, whilst the above has been described in the context of a call, the techniques can be applied in other contexts, for example to the coding of pre-recorded or broadcast audio content (e.g. digital radio). It is also possible for the server to forward information from one endpoint to another in a conference scenario, e.g. the information about their audio output devices, allowing the endpoints themselves to adapt their coding accordingly.

Note also that, whilst in the above, the audio codec operated according to a target bit rate, this is not essential. For example, an audio codec may adapt aspects of the audio coding it is applying, such as the quantization parameter(s), based on channel feedback directly (for example, by increasing the aggressiveness of the coder, e.g., the quantization, when audio packet loss is detected).

In the context of a transmitted audio signal, an "audio codec" means audio signal processing logic of the local device that is configured to apply audio coding to the audio signal to convert it to coded audio data for transmission. In a two-way transmission scenario, in which the local device also receives coded audio data from the remote device, the audio codec of the local device also implements corresponding decoding functionality, though this may be unnecessary to apply in a one-way transmission scenario. That is, the term audio codec can refer to audio coding and decoding logic only. The audio codec can for example be implemented as code executed on a processor of the local device (i.e. as software), as dedicated hardware (e.g. application-specific integrated circuit, field-programmable gate array (FPGA) etc.) of the local device, or as a combination of such hardware and software.

Although described primarily in a software context, generally, any of the functions described herein, and in particular the functions of the audio signal processing system 300, can be implemented using any suitable form of logic; that is, software (program code), firmware, hardware (e.g., fixed logic circuitry, FPGA etc.), or any combination thereof configured to carry out the described operations of the audio coding system 300. The program code, such as the application 206, can be stored in one or more computer readable memory devices. The features of the techniques described herein are platform-independent, meaning that the techniques may be implemented on a variety of commercial computing platforms having a variety of processors. For example, the audio signal processing device 202 may include a computer-readable medium, such as the memory 208, that may be configured to maintain instructions, such as instructions of the application 206, that cause the devices, and more particularly an operating system and associated hardware of the devices to perform the operations of the audio coding system 300. Thus, the instructions function to configure the operating system and associated hardware to perform the operations and in this way result in transformation of the operating system and associated hardware to perform functions. The instructions may be provided by the computer-readable medium to the device through a variety of different configurations. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device comprising:
a processor; and
a memory in communication with the processor, the memory comprising executable instructions that, when executed by the processor, cause the processor to control the device to perform functions of:
receiving, via a communication channel from a remote device, a characteristic of an audio output device connected to the remote device;
determining, based on the received characteristic of the audio output device, an audio bandwidth parameter for sampling an audio signal to be transmitted to the remote device via the communication channel;
receiving an input audio signal;
sampling, based on the audio bandwidth parameter, the received input audio signal to generate audio data having an audio bandwidth corresponding to the characteristic of the audio output device connected to the remote device;
encoding the audio data to generate encoded audio data; and
transmitting, via the communication channel, the encoded audio data to the remote device.

2. The device of claim 1, wherein:
the instructions, when executed by the processor, further cause the processor to control the device to perform a function of determining a target data rate for transmitting the encoded audio data via the communication channel to the remote device, and
for encoding the audio data, the instructions, when executed by the processor, cause the processor to control the device to perform a function of encoding, based on the target data rate, the generated audio data.

3. The device of claim 2, wherein, for determining the audio bandwidth parameter, the instructions, when executed by the processor, cause the processor to control the device to perform a function of determining, further based on the target data rate, the audio bandwidth parameter.

4. The device of claim 3, wherein, for determining the audio bandwidth parameter, the instructions, when executed by the processor, further cause the processor to control the device to perform functions of:
determining, based on the received characteristic of the audio output device, a threshold for adjusting the audio bandwidth parameter;
comparing the target data rate with the threshold; and
adjusting the audio bandwidth parameter based on the comparison between the target data rate and the threshold.

5. The device of claim 1, wherein the characteristic of the audio output device indicates whether the audio output device is integrated in the remote device or external to the remote device.

6. The device of claim 4, wherein:
the characteristic of the audio output device indicates whether the audio output device is integrated in or external to the remote device; and
the instructions, when executed by the processor, further cause the processor to control the device to perform a functions of lowering the threshold when the characteristic of the audio output device indicates that the audio output device is integrated in the remote device.

7. The device of claim 1, wherein the received input audio signal comprises a digital audio signal.

8. The device of claim 1, wherein the instructions, when executed by the processor, further cause the processor to control the device to perform a functions of filtering, based on the audio bandwidth parameter, the received input audio signal.

9. The device of claim 1, wherein the instructions, when executed by the processor, further cause the processor to control the device to perform functions of:
receiving, via the communication channel, an indication denoting a change of an audio output device setup at the remote device; and
changing the audio bandwidth parameter.

10. The device of claim 1, wherein, for transmitting the encoded audio data, the instructions, when executed by the processor, cause the processor to control the device to perform a function of transmitting, via the communication channel, the encoded audio data to the remote device as part of data stream for a call with the remote device.

11. The device of claim 9, wherein:
for transmitting the encoded audio data, the instructions, when executed by the processor, cause the processor to control the device to perform a function of transmitting, via the communication channel, the encoded audio data to the remote device as part of data stream for a call with the remote device, and
when the change of the audio output device setup occurs during the call, the remote device transmits the indication, via the communication channel, to the device during the call.

12. The device of claim 2, wherein:
the characteristic of the audio output device indicates whether the audio output device is integrated in or external to the remote device; and
for determining the audio bandwidth parameter, the instructions, when executed by the processor, cause the processor to control the device to perform a function of lowering the audio bandwidth parameter when the received characteristic of the audio output device indicates that the audio output signal is integrated in the remote device.

13. The device of claim 2, wherein, for determining the target data rate, the instructions, when executed by the processor, cause the processor to control the device to perform a function of monitoring the communication channel.

14. A method of operating a device, comprising
receiving, via a communication channel from a remote device, a characteristic of an audio output device connected to the remote device;
determining, based on the received characteristic of the audio output device, an audio bandwidth parameter for sampling an audio signal to be transmitted to the remote device via the communication channel;
receiving an input audio signal;
sampling, based on the audio bandwidth parameter, the received input audio signal to generate audio data having an audio bandwidth corresponding to the characteristic of the audio output device connected to the remote device;
encoding the audio data to generate encoded audio data; and
transmitting, via the communication channel, the encoded audio data to the remote device.

15. The method of claim 14, further comprising determining a target data rate for transmitting the encoded audio data via the communication channel to the remote device, wherein encoding the audio data comprises encoding, based on the target data rate, the generated audio data.

16. The method of claim 15, wherein determining the audio bandwidth parameter comprises determining, further based on the target data rate, the audio bandwidth parameter.

17. The method of claim 16, wherein determining the audio bandwidth parameter further comprises:
determining, based on the received characteristic of the audio output device, a threshold for adjusting the audio bandwidth parameter;
comparing the target data rate with the threshold; and
adjusting the audio bandwidth parameter based on the comparison between the target data rate and the threshold.

18. The method of claim 14, wherein the characteristic of the audio output device indicates whether the audio output device is integrated in the remote device or external to the remote device.

19. The method of claim 17, wherein the characteristic of the audio output device indicates whether the audio output device is integrated in or external to the remote device, the method further comprising lowering the threshold when the characteristic of the audio output device indicates that the audio output device is integrated in the remote device.

20. The method of claim 14, wherein the received input audio signal comprises a digital audio signal.

21. The method of claim 14, further comprising filtering, based on the audio bandwidth parameter, the received input audio signal.

22. The method of claim 14, further comprising:
receiving, via the communication channel, an indication denoting a change of an audio output device setup at the remote device; and
changing the audio bandwidth parameter.

23. The method of claim 14, wherein transmitting the encoded audio data comprises transmitting, via the communication channel, the encoded audio data to the remote device as part of data stream for a call with the remote device.

24. The method of claim 22, wherein transmitting the encoded audio data comprises transmitting, via the communication channel, the encoded audio data to the remote device as part of data stream for a call with the remote device, and
when the change of the audio output device setup occurs during the call, the remote device transmits the indication, via the communication channel, to the device during the call.

25. The method of claim 15, wherein:
the characteristic of the audio output device indicates whether the audio output device is integrated in or external to the remote device, and
determining the audio bandwidth parameter comprises lowering the audio bandwidth parameter when the received characteristic of the audio output device indicates that the audio output signal is integrated in the remote device.

26. A non-transitory computer readable medium containing instructions which, when executed by a processor, cause a device to perform functions of:
receiving, via a communication channel from a remote device, a characteristic of an audio output device connected to the remote device;
determining, based on the received characteristic of the audio output device, an audio bandwidth parameter for sampling an audio signal to be transmitted to the remote device via the communication channel;
receiving an input audio signal;
sampling, based on the audio bandwidth parameter, the received input audio signal to generate audio data having an audio bandwidth corresponding to the characteristic of the audio output device connected to the remote device;
encoding the audio data to generate encoded audio data; and
transmitting, via the communication channel, the encoded audio data to the remote device.

* * * * *